(12) United States Patent
Wu

(10) Patent No.: US 9,317,558 B2
(45) Date of Patent: Apr. 19, 2016

(54) INTELLIGENT UNMASKING IN AN IN-MEMORY DATABASE

(71) Applicant: Zhiqiang Wu, Shanghai (CN)

(72) Inventor: Zhiqiang Wu, Shanghai (CN)

(73) Assignee: SAP SE, Walldorf (DE)

( * ) Notice: Subject to any disclaimer, the term of this patent is extended or adjusted under 35 U.S.C. 154(b) by 218 days.

(21) Appl. No.: 14/276,643

(22) Filed: May 13, 2014

(65) Prior Publication Data

US 2015/0331911 A1    Nov. 19, 2015

(51) Int. Cl.
*G06F 17/30* (2006.01)
(52) U.S. Cl.
CPC .... *G06F 17/30498* (2013.01); *G06F 17/30466* (2013.01)
(58) Field of Classification Search
CPC .............. G06F 17/30; G06F 17/30466; G06F 17/30498
USPC ........................................................ 707/714
See application file for complete search history.

(56) References Cited

U.S. PATENT DOCUMENTS

| | | | | |
|---|---|---|---|---|
| 9,069,987 B2* | 6/2015 | Branish, II | .......... | H04L 63/0428 |
| 9,135,315 B2* | 9/2015 | Barbas | .............. | G06F 17/30554 |
| 2003/0078922 A1* | 4/2003 | Pham | ................ | G06F 17/30466 |
| | | | | 707/999.004 |
| 2010/0205189 A1* | 8/2010 | Ebrahimi | ............ | G06F 21/6227 |
| | | | | 707/757 |
| 2011/0313979 A1* | 12/2011 | Roberts | ............... | G06F 17/3051 |
| | | | | 707/690 |
| 2013/0185280 A1* | 7/2013 | Ma | .................... | G06F 17/30498 |
| | | | | 707/714 |
| 2013/0282697 A1* | 10/2013 | Barbas | ............. | G06F 17/30483 |
| | | | | 707/722 |
| 2014/0101129 A1* | 4/2014 | Branish, II | ........ | G06F 17/30893 |
| | | | | 707/714 |

* cited by examiner

*Primary Examiner* — Vincent Boccio
(74) *Attorney, Agent, or Firm* — Fountainhead Law Group PC

(57) ABSTRACT

Database data is unmasked in order to facilitate its efficient handling by a database engine. In response to a request for data of a masked table including a masked element, an engine identifies a mask interval, and then performs a first join with unmasked elements sharing a common key. The table resulting from this first join is then grouped according to a highest level location of the mask. A second join is then performed between the results of this grouping and the mask interval, to produce a corresponding unmasked table including a plurality of unmasked elements corresponding to the masked element. Unmasking according to embodiments may be particularly useful in leveraging processing power of an in-memory database engine, allowing it to efficiently perform batch processing of requests for masked data received from software of an overlying application layer.

18 Claims, 10 Drawing Sheets

Results Analysis Key

Is the object relevant at all?

*OKG1*

Results Analysis Version

Which approaches will be taken e.g. percentage of completion?

*OKG2*

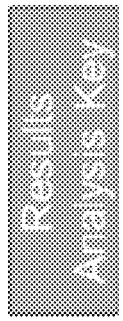

Line IDs

How to group costs?

*V_KKAX*

Results Analysis Methods

Which costs/revenues are relevant e.g. plan or only actual?

*OKG3 (TKKAS)*

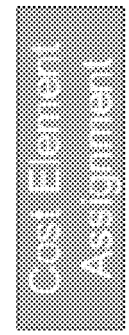

Results Analysis Cost Elements

Used to write WIP, etc to COSB

*OKG4 (TKKAR)*

Cost Element Assignment

Assign cost elements to line IDs

*OKG5 (TKKAZ)*

FIG. 2A

Display View "Assignment of Cost Elements for WIP and Results Analysis"

| CO... | RA ... | RA Key | Masked Co... | ReqToCap | OptToCap | CannotBeCap | % OptToCap | % CannotBeCap |
|---|---|---|---|---|---|---|---|---|
| 0001 | 0 | KOND1 | 00008+++++ | EL | | | 0,00 | 0,00 |
| 0001 | 0 | KOND1 | 000080+++++ | EL | | | 0,00 | 0,00 |
| 0001 | 0 | KOND1 | 000080291 | BON | | | 0,00 | 0,00 |
| 0001 | 0 | KOND1 | 000081+++++ | ABR | | | 0,00 | 0,00 |
| 0001 | 0 | KOND1 | 0000895+++ | ABR | | | 0,00 | 0,00 |

FIG. 3

```
lt_tkkaz_for_unmasking =
 select
   abgsl, zidap, zidaw, zidnf,
   krkmk, bekmk, vfkmk, kyrs1, bemmk,
   replace (koamk, '+', '0') as kstar_low,
   replace (koamk, '+', '9') as kstar_high,
   case locate (koamk, '+')
     when 0 then 11
     else locate (koamk, '+')
   end as first_mask_position,
   rtrim (koamk, '+')   as group_prefix
 from tkkaz as tkkaz
 where
   mandt = :iv_client
   and versa = :iv_ra_version
   and kokrs = :iv_coarea;
```

FIG. 5A

```
call "CL_FCO_KKAK_AMDP=>SELECT_ABGSL_KSTAR" (
      :iv_client,   :it_so_item_ra_method,
      :lt_orders_read_actual,  :lt_orders_read_plan,  lt_abgsl_kstar);
```

FIG. 5B

```
lt_tkkaz_max_pos =
  select lak.abgsl, kstar,
      max(first_mask_position) as max_position,
      left(kstar,max(first_mask_position)-1) as group_prefix
  from
    :lt_abgsl_kstar as lak
    left outer join :lt_tkkaz_ra as tkkaz
    on lak.abgsl = tkkaz.abgsl and
        (kstar >= kstar_low and kstar <= kstar_high)
  group by lak.abgsl, kstar;
```

FIG. 5C

```
lt_tkkaz_unmasked =
  select tkkaz.abgsl, kstar, zidap
  from :lt_tkkaz_ra as tkkaz
    inner join :lt_tkkaz_max_pos as max
    on
      tkkaz.abgsl = max.abgsl
      and tkkaz.group_prefix = max.group_prefix
      and tkkaz.first_mask_position = max.max_position;
```

FIG. 5D

INTELLIGENT UNMASKING IN AN IN-MEMORY DATABASE

BACKGROUND

Embodiments relate to retrieving data from a database, and in particular, to methods and systems utilizing intelligent unmasking on an in-memory database.

Unless otherwise indicated herein, the approaches described in this section are not prior art to the claims in this application and are not admitted to be prior art by inclusion in this section.

Certain software applications allow a user to interact with an underlying database to retrieve stored information. Some such applications may provide the user with the ability to map to multiple data elements within the database utilizing a mask.

For example, Enterprise Resource Planning (ERP) software available from SAP AG allows a user to store data regarding cost elements. In an ERP customizing table comprising cost elements, a customer can configure '+' in a column in order to map to one or more cost elements. For example, '00008+++++' can map to all of the cost elements starting with '00008' utilizing the '+' mask symbol within a string of characters. Such a masking function can impart substantial flexibility to a user seeking to retrieve various related data from the underlying database.

Conventional database architectures such as disk-based databases, may typically utilize an engine located in an overlying application layer, to retrieve information (such as data objects) from the underlying database. Such an application-level engine may access underlying database objects one-by-one, using loops.

Recently, however, a trend has emerged to utilize in-memory database architectures. Such in-memory database architectures employ a powerful processing engine located in the underlying database layer.

The programming model of such an in-memory database architecture, may differ significantly from those of conventional (e.g., disk-based) databases. Rather than handling objects one-by-one via loops, an in-memory database may handle data objects instead utilizing a batch approach.

While such batch handling may be useful to increase speed, it may offer certain challenges. Specifically, in-memory database approaches pushing application logic from the application layer down into the underlying database layer (e.g. to interact with masked tables), may result in delays and reduced performance.

Accordingly, there is a need for unmasking techniques for use in conjunction with in-memory database systems.

SUMMARY

Database data is unmasked in order to facilitate its efficient handling by a database engine. In response to a request for data of a masked table including a masked element, an engine identifies a mask interval, and then performs a first join with unmasked elements sharing a common key. The table resulting from this first join is then grouped according to a highest level location of the mask. A second join is then performed between the results of this grouping and the mask interval, to produce a corresponding unmasked table including a plurality of unmasked elements corresponding to the masked element. Unmasking according to embodiments may be particularly useful in leveraging processing power of an in-memory database engine, allowing it to efficiently perform batch processing of requests for masked data received from software of an overlying application layer.

An embodiment of a computer-implemented method comprises causing an engine to receive a request for data stored in a first table comprising a masked element including a key and a mask, the masked element corresponding to a plurality of unmasked elements in a database. The engine is caused to process the first table to create a second table converting the masked element into an element interval indicating a highest level position of the mask. The engine is caused to create a third table selecting the plurality of unmasked elements sharing the key. The engine is caused to perform a first join operation of the second table and the third table to create a fourth table including the plurality of unmasked elements sharing the key and falling within the element interval. The engine is caused to perform a grouping operation of the fourth table to create a fifth table locating a maximum position of the mask with the plurality of the unmasked elements. The engine performs a second join operation of the fifth table and the first table to create a sixth table including the plurality of unmasked elements and the key. The engine is caused to process the request on the sixth table.

An embodiment of a non-transitory computer readable storage medium embodies a computer program for performing a method comprising causing an engine to receive a request for data stored in a first table comprising a masked element including a key and a mask, the masked element corresponding to a plurality of unmasked elements in a database. The engine is caused to process the first table to create a second table converting the masked element into an element interval indicating a highest level position of the mask. The engine is caused to create a third table selecting the plurality of unmasked elements sharing the key. The engine is caused to perform a first join operation of the second table and the third table to create a fourth table including the plurality of unmasked elements sharing the key and falling within the element interval. The engine is caused to perform a grouping operation of the fourth table to create a fifth table locating a maximum position of the mask with the plurality of the unmasked elements. The engine is caused to perform a second join operation of the fifth table and the first table to create a sixth table including the plurality of unmasked elements and the key. The engine is caused to process the request on the sixth table.

An embodiment of a computer system comprises one or more processors, and a software program, executable on said computer system. The software program is configured to cause an engine to receive a request for data stored in a first table comprising a masked element including a key and a mask, the masked element corresponding to a plurality of unmasked elements in a database. The engine is caused to process the first table to create a second table converting the masked element into an element interval indicating a highest level position of the mask. The engine is caused to create a third table selecting the plurality of unmasked elements sharing the key. The engine is caused to perform a first join operation of the second table and the third table to create a fourth table including the plurality of unmasked elements sharing the key and falling within the element interval. The engine is caused to perform a grouping operation of the fourth table to create a fifth table locating a maximum position of the mask with the plurality of the unmasked elements. The engine is caused to perform a second join operation of the fifth table and the first table to create a sixth table including the plurality of unmasked elements and the key. The engine is caused to process the request on the sixth table.

In certain embodiments the engine comprises a database engine.

According to particular embodiments the database engine comprises an in-memory database engine receiving instructions from an overlying application layer.

For some embodiments the masked element comprises a string of characters including a mask symbol.

In various embodiments a location of the mask symbol in the string indicates a level position of the mask.

According to particular embodiments the engine is configured to retrieve data from the database according to the request utilizing batch processing.

The following detailed description and accompanying drawings provide a better understanding of the nature and advantages of embodiments.

BRIEF DESCRIPTION OF THE DRAWINGS

FIG. 2A identifies various elements that may be utilized in performing Results Analysis in a period end closing.

FIG. 3 shows an example of a masked table.

FIGS. 5A-5D show code for implementing one embodiment.

DETAILED DESCRIPTION

Described herein are techniques for intelligent unmasking in an in-memory database. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Database data is unmasked in order to facilitate its efficient handling by a database engine. In response to a request for data of a masked table including a masked element, an engine identifies a mask interval, and then performs a first join with unmasked elements sharing a common key. The table resulting from this first join is then grouped according to a highest level location of the mask. A second join is then performed between the results of this grouping and the mask interval, to produce a corresponding unmasked table including a plurality of unmasked elements corresponding to the masked element. Unmasking according to embodiments may be particularly useful in leveraging processing power of an in-memory database engine, allowing it to efficiently perform batch processing of requests for masked data received from software of an overlying application layer.

Figure 1:
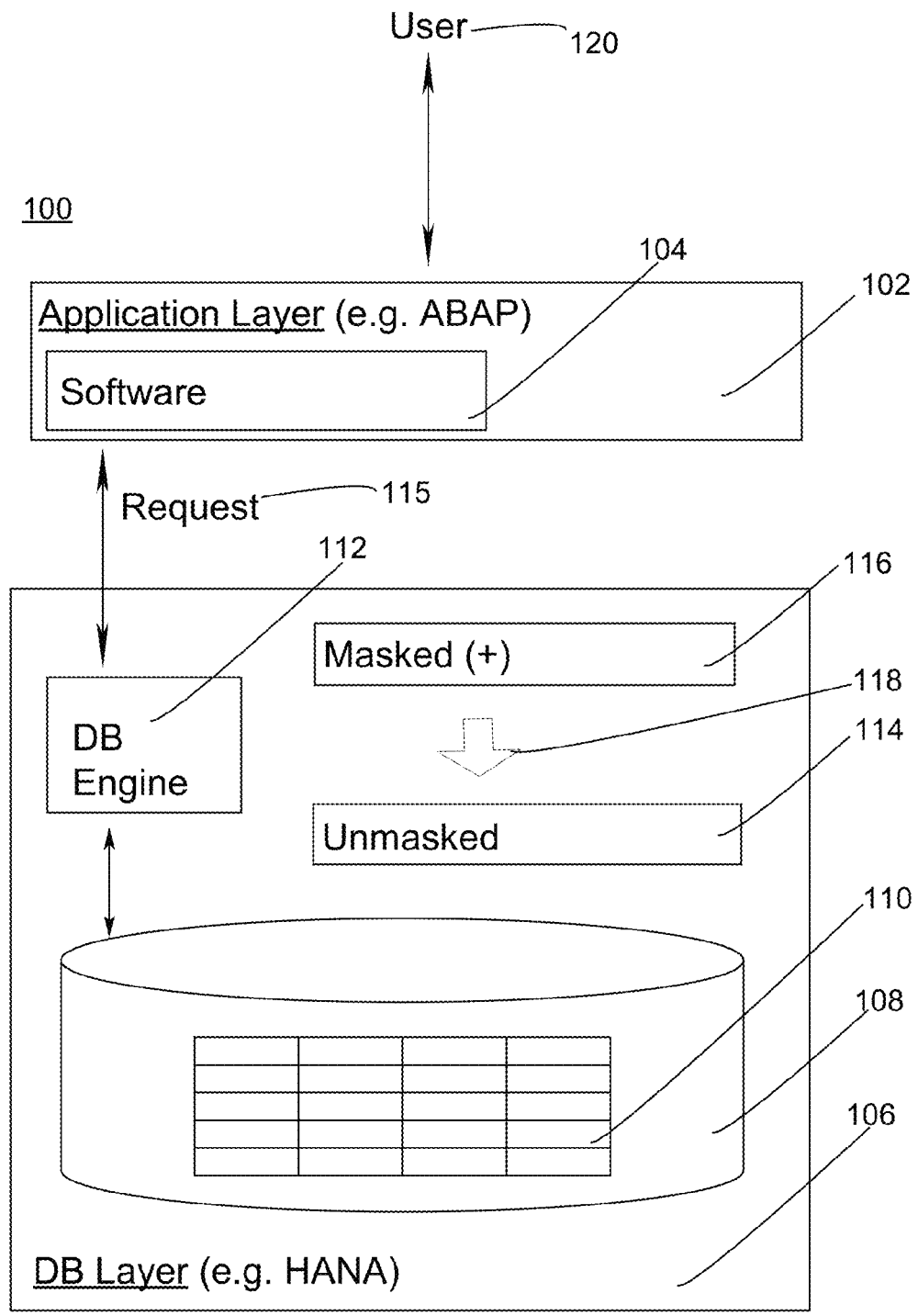
FIG. 1 illustrates a system configured to perform unmasking according to one embodiment.

FIG. 1 shows a simplified view of a system 100 configured to perform unmasking according to an embodiment. Application layer 102 provides the environment supporting operation of a software program 104, such as a financial (FI) planning platform. One example of such software is Enterprise Resource Planning (ERP) software available from SAP AG of Walldorf, Germany.

The software program resident within the application layer, is designed to access and manipulate various types of data present in a database (DB) layer 106. The application layer then presents that data to a user 120.

In particular, that database layer may comprise a non-transitory computer readable storage medium 108 having a database 110 stored thereon. The database layer further comprises a database engine 112 that is configured to govern interaction with the underlying database structure.

As described above, certain software programs may expect to issue a request 115 to interact with database data in masked form 116. In certain embodiments the mask may be indicated by a designated symbol (here "+") appearing at a location in a string of characters. As described above, however, the use of such mapping to create masked data, may be difficult for an in-memory database to handle efficiently utilizing batch processing.

Thus according to embodiments, the database engine of the database layer may be configured to perform an unmasking process 118, whereby the masked data of a database table is converted into unmasked form 114, in response to a request for access issued by the overlying application layer. As is explained in detail below, in connection with the example part of that unmasking process may involve performance of operations such as Group By and/or Join. The unmasked data is then available for access to retrieve information in an efficient (e.g., batch processing) manner.

Figure 1A:
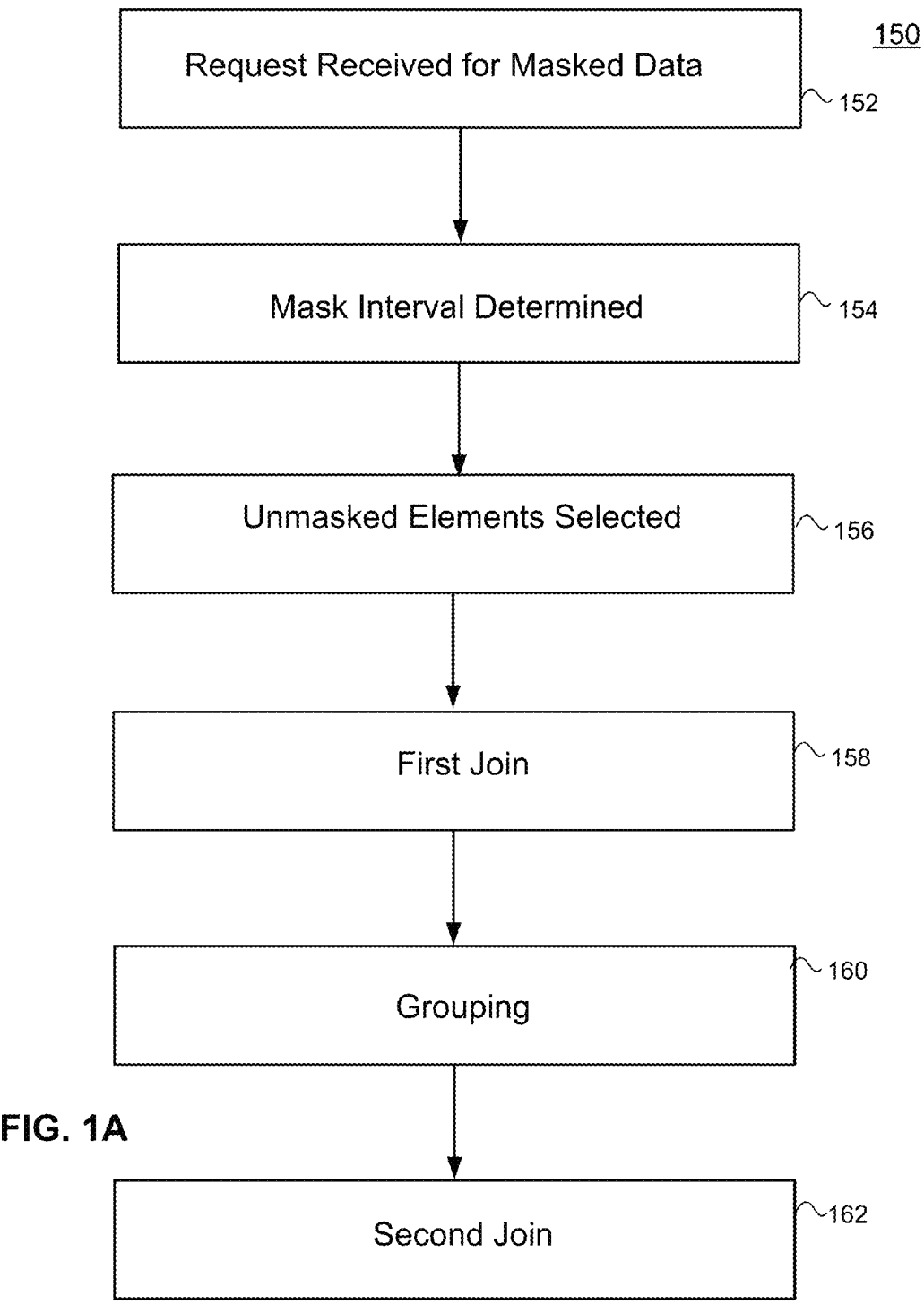
FIG. 1A illustrates steps of an embodiment of a method of unmasking according to an embodiment.

FIG. 1A is a simplified flow diagram showing steps of a process 150 according to an embodiment. A first step 152 comprises causing an engine to receive a request for data stored in a first table comprising a masked element including a key and a mask, the masked element corresponding to a plurality of unmasked elements in a database.

A second step 154 comprises causing the engine to process the first table to create a second table converting the masked element into an element interval indicating a highest level position of the mask.

A third step 156 comprises causing the engine to create a third table selecting the plurality of unmasked elements sharing the key.

A fourth step 158 comprises causing the engine to perform a first join operation of the second table and the third table to create a fourth table including the plurality of unmasked elements sharing the key and falling within the element interval.

A fifth step 160 comprises causing the engine to perform a grouping operation of the fourth table to create a fifth table locating a maximum position of the mask with the plurality of the unmasked elements.

A sixth step 162 comprises causing the engine to perform a second join operation of the fifth table and the first table to create a sixth table including the plurality of unmasked elements and the key.

Now having the data of the masked table available in unmasked form, the engine is free to process the request in an efficient manner (e.g., via batch processing) on the unmasked data of the sixth table.

To provide additional understanding of various embodiments, a specific example is now described below. These describe techniques implemented utilizing the HANA in-memory database available from SAP AG of Walldorf, Germany.

However, it is noted that other types of in-memory databases are known. These include the SYBASE IQ database also available from SAP AG; the Microsoft Embedded SQL for C (ESQL/C) database available from Microsoft Corp. of Redmond, Wash.; and the Exalytics In-Memory database available from Oracle Corp. of Redwood Shores, Calif.

EXAMPLE

This specific example relates to unmasking a table of financial information in the HANA in-memory database in a period end closing process. This unmasked data is provided for use by Enterprise Resource Planning (ERP) financial software present in an application layer overlying the database. Here, that application layer comprises the ABAP platform also available from SAP AG.

Customers expect faster period end closing after upgrading their SAP ERP system from a traditional database to the HANA in-memory database environment. In the controlling module (CO) of the ERP software, the transactions required for period end closing are called upon to handle a large data volume, and these transactions become slower as data volumes increase in the customer systems.

Figure 2:
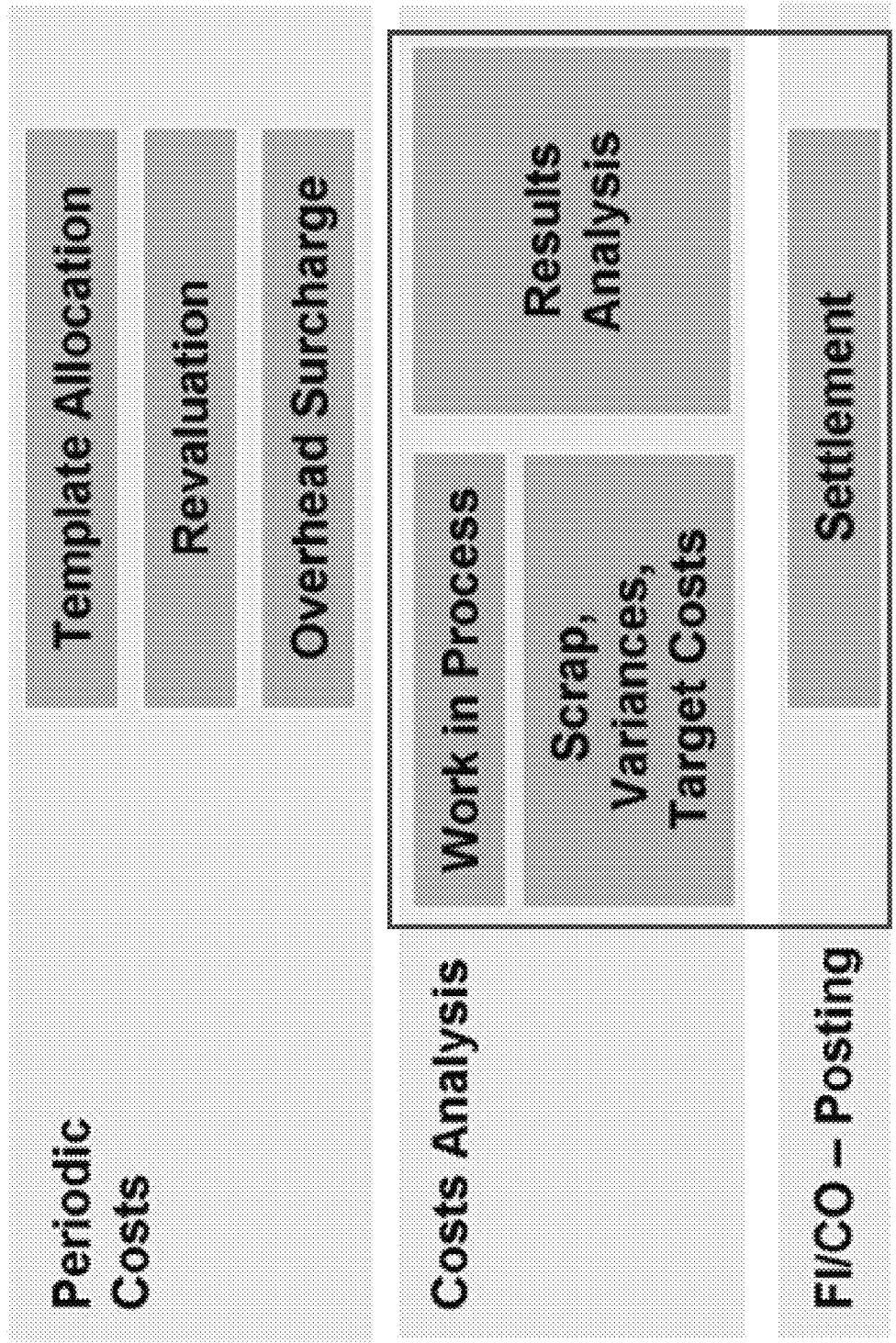
FIG. 2 shows an overview of period end closing in a financial system.

FIG. 2 shows a simplified view of the transactions of period end closing. In order to improve performance by leveraging the processing power of the in-memory database, the code logic for the "Work in Progress" (WIP), "Scrap, Variances, Target Costs", "Results Analysis", and "Settlement" transactions, was pushed from the ABAP application layer into the underlying HANA database layer.

As is also the case with other transactions in SAP ERP, in the CO transactions for WIP calculation and Results Analysis configuration tables may be provided to customers to allow them to customize the calculation process according to their specific needs. FIG. 2A shows an overview of configuration tables used in WIP calculation and Results Analysis.

FIG. 3 shows the particular customizing table TKKAZ (Assignments of Cost Elements for WIP and Results Analysis). There, the customer can configure the designated mask symbol '+' in column "Masked Cost Element" to map to one or more cost elements.

For example, '00008+++++' can map to all of the cost elements starting with '00008'. Such a mapping function can thus impart substantial flexibility to a user seeking to retrieve various pieces of data from the underlying database. In fact, a customer can even configure the field with overlaps.

An example of such overlap could arise where a user interface screen includes the following fields (moving from specific to more general), shown in FIG. 3:

00008+++++
000080++++
0000800291

Here, the symbol "+" indicates a mask that allows mapping to multiple elements.

Where there are multiple matches for one given cost element, there can be only a single entry that wins. This is resolved by awarding the higher priority to the more specific entry. Three concrete examples are now given below.

1. The cost element '0000800291' can map to '00008+++++', '000080++++', and '0000800291'. But, the system will take the assignment from line 3 since it is the most specific one.

2. The cost element '0000800000' can map to both '00008+++++' and '000080++++'. But, the system will take the assignment from line 2 since it is the most specific one in this case.

3. The cost element '0000830000' can map only to '00008+++++'. The system will take the assignment from line 1 directly.

Figure 4:
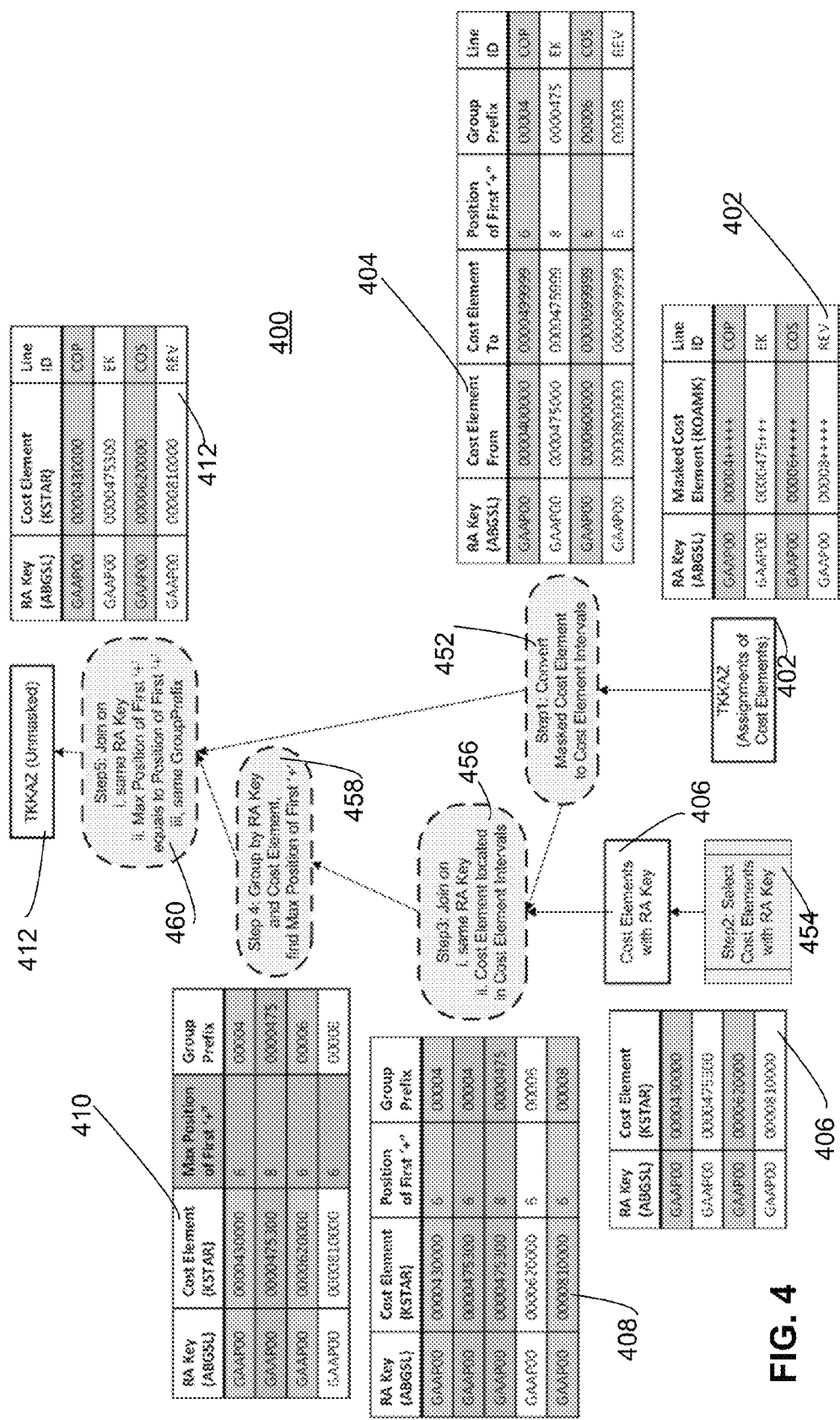
FIG. 4 shows details of one embodiment of a data unmasking process.

In order to perform data handling of such masked data in an in-memory database environment, an unmasking approach according to an embodiment was employed. FIG. 4 explains the main logic 400 of this particular embodiment. FIGS. 5A-5C show specific computer code which may be utilized to implement this embodiment.

The starting point for FIG. 4 is the masked table TKKAZ 402. That table comprises an RA Key (ABGSL) and a Masked Cost Element (KOAMK). Masking is again indicated with the "+" designated symbol.

The main logic of the process of unmasking this table in FIG. 4, can be divided into the following five (5) steps. A first step 452 converts the column 'Masked Cost Element' (KOAMK) of the table 'Assignments of Cost Elements' (TKKAZ), into 'Cost Element Intervals' [Cost Element From, Cost Element To]:

Cost Element From=Masked Cost Element with all '+' replaced by '0';
Cost Element To=Masked Cost Element with all '+' replaced by '9'.

In addition, two new fields are introduced as follows:
Position of First '+'=Position of first occurrence of '+' in Masked Cost Element;
Group Prefix=Masked Cost Element without '+'.
The table resulting from this step, is shown as 404 in FIG. 4.

FIG. 5A shows corresponding computer code configured to perform this first step. In particular, the code of FIG. 5A functions to read and convert the cost elements assignment table TKKAZ.

A second step 454 selects all unique combination of Cost Element (KSTAR) and RA Key (ABGSL) from the transaction data of given objects. This second step results in the generation of the table 406 of FIG. 4.

FIG. 5B shows corresponding computer code configured to perform this second step. In particular, the code of FIG. 5B functions to select unique combinations of ABGSL and KSTAR.

Step three 456 of FIG. 4 shows Joining the table 404 and the table 406, with Join conditions as given below, to result in the table 408:

406~RA Key=404~RA Key
406~Cost Element>=404~Cost Element From
406~Cost Element<=404~Cost Element To Step four 458 of FIG. 4 shows grouping the table records of table 408 by RA Key and Cost Element, and find the Max Position of First '+' in each group. This results in the table 410 of FIG. 4.

FIG. 5C shows corresponding computer code configured to perform the third and fourth steps. In particular, the code of FIG. 5C functions to join the tables and to find the maximum position of the first '+' in each group.

The fifth step in the unmasking process is shown in 460. In particular, the table 410 is Joined with the table 404, with Join conditions below:

410~RA Key=404~RA Key
410~Max Position of First '+'=404~Position of First '+'
410~Group Prefix=404~Group Prefix The table 412 corresponding from this join is shown in FIG. 4. This table 412 corresponds to the TKKAZ table with all cost elements unmasked.

FIG. 5D shows corresponding computer code configured to perform this fifth step. In particular, the code of FIG. 5D functions to Join the tables and obtain the unmasked TKKAZ table.

The unmasking approach just described was performed on a given data set. The unmasking solution was observed to operate very quickly, taking about 230 ms in duration. The unmasking solution was also observed to run in parallel to other more time-consuming processes, without impacting (delaying) end-to-end execution time of the ERP application.

Particular embodiments have been described above in connection with handling masked data by an in-memory database. Alternative embodiments could employ an unmasking process in order to facilitate batch processing of masked data in other environments, for example a conventional disk-based database that is configured to employ batch processing.

Figure 6:
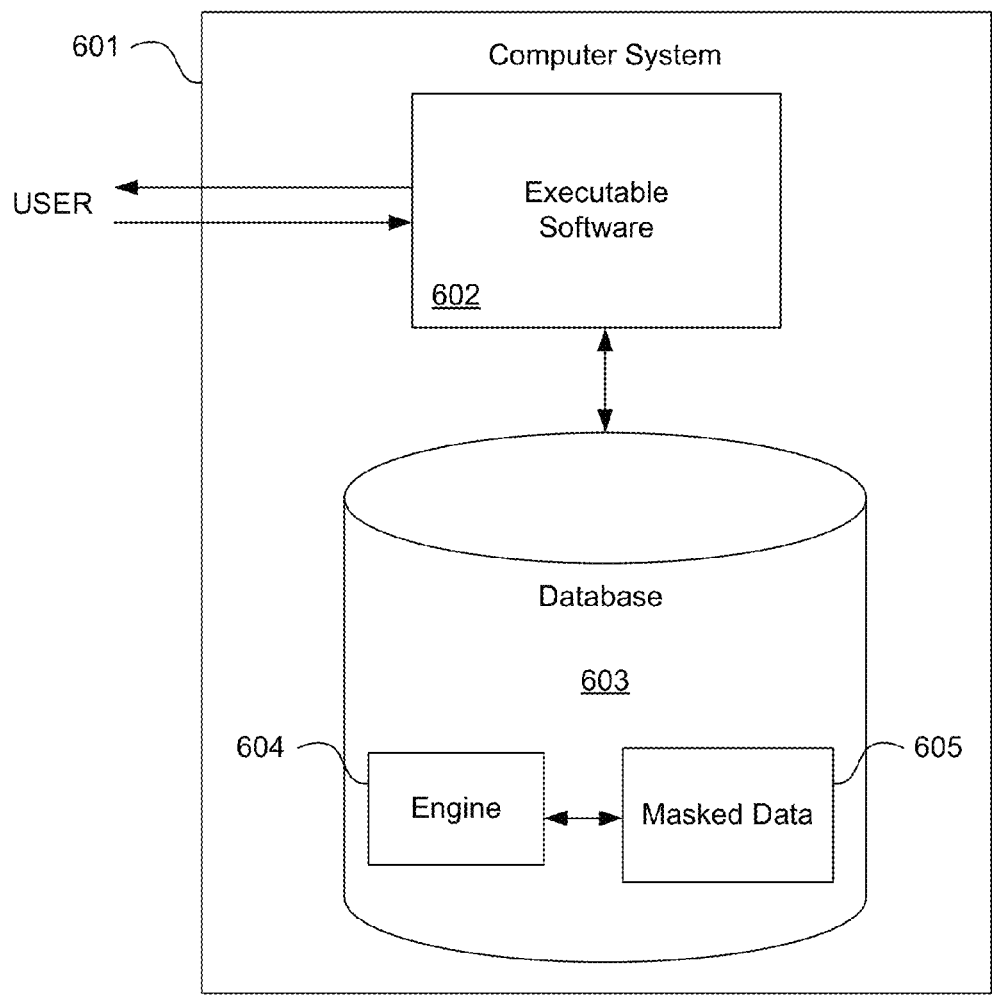
FIG. 6 illustrates hardware of a special purpose computing machine configured to perform data umasking according to an embodiment.

FIG. 6 illustrates hardware of a special purpose computing machine configured to perform data unmasking according to an embodiment. In particular, computer system 601 comprises a processor 602 that is in electronic communication with a non-transitory computer-readable storage medium 603. This computer-readable storage medium has stored thereon code 605 corresponding to masked data. Code 604 corresponds to an engine (e.g., a database engine of an in-memory database). Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

Figure 7:
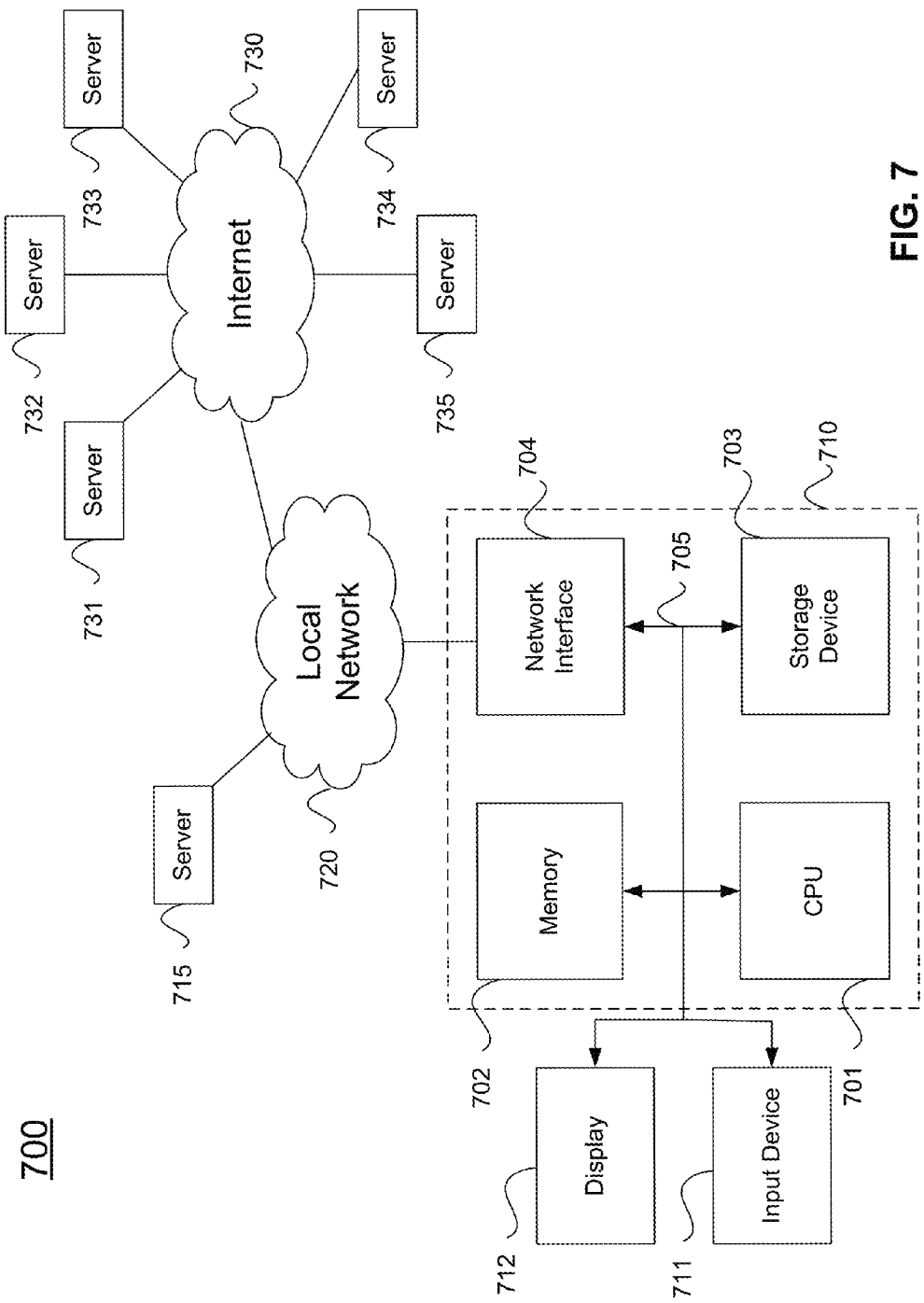
FIG. 7 illustrates an example of a computer system.

An example computer system 710 is illustrated in FIG. 7. Computer system 710 includes a bus 705 or other communication mechanism for communicating information, and a processor 701 coupled with bus 705 for processing information. Computer system 710 also includes a memory 702 coupled to bus 705 for storing information and instructions to be executed by processor 701, including information and instructions for performing the techniques described above, for example. This memory may also be used for storing variables or other intermediate information during execution of instructions to be executed by processor 701. Possible implementations of this memory may be, but are not limited to, random access memory (RAM), read only memory (ROM), or both. A storage device 703 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 703 may include source code, binary code, or software files for performing the techniques above, for example. Storage device and memory are both examples of computer readable mediums.

Computer system 710 may be coupled via bus 705 to a display 712, such as a cathode ray tube (CRT) or liquid crystal display (LCD), for displaying information to a computer user. An input device 711 such as a keyboard and/or mouse is coupled to bus 705 for communicating information and command selections from the user to processor 701. The combination of these components allows the user to communicate with the system. In some systems, bus 705 may be divided into multiple specialized buses.

Computer system 710 also includes a network interface 704 coupled with bus 705. Network interface 704 may provide two-way data communication between computer system 710 and the local network 720. The network interface 704 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 704 sends and receives electrical, electromagnetic, or optical signals that carry digital data streams representing various types of information.

Computer system 710 can send and receive information, including messages or other interface actions, through the network interface 704 across a local network 720, an Intranet, or the Internet 730. For a local network, computer system 710 may communicate with a plurality of other computer machines, such as server 715. Accordingly, computer system 710 and server computer systems represented by server 715 may form a cloud computing network, which may be programmed with processes described herein. In the Internet example, software components or services may reside on multiple different computer systems 710 or servers 731-735 across the network. The processes described above may be implemented on one or more servers, for example. A server 731 may transmit actions or messages from one component, through Internet 730, local network 720, and network interface 704 to a component on computer system 710. The software components and processes described above may be implemented on any computer system and send and/or receive information across a network, for example.

The above description illustrates various embodiments of the present invention along with examples of how certain aspects may be implemented. The above examples and embodiments should not be deemed to be the only embodiments, and are presented to illustrate the flexibility and advantages of the present invention as defined by the following claims. Based on the above disclosure and the following claims, other arrangements, embodiments, and implementations may be employed.

What is claimed is:

1. A computer-implemented method comprising:
    causing an engine to receive a request for data stored in a first table comprising a masked element including a key and a mask, the masked element corresponding to a plurality of unmasked elements in a database;
    causing the engine to process the first table to create a second table converting the masked element into an element interval indicating a highest level position of the mask;
    causing the engine to create a third table selecting the plurality of unmasked elements sharing the key;
    causing the engine to perform a first join operation of the second table and the third table to create a fourth table including the plurality of unmasked elements sharing the key and falling within the element interval;
    causing the engine to perform a grouping operation of the fourth table to create a fifth table locating a maximum position of the mask with the plurality of the unmasked elements;
    causing the engine to perform a second join operation of the fifth table and the first table to create a sixth table including the plurality of unmasked elements and the key; and
    causing the engine to process the request on the sixth table.

2. A method as in claim 1 wherein the engine comprises a database engine.

3. A method as in claim 2 wherein the database engine comprises an in-memory database engine receiving instructions from an overlying application layer.

4. A method as in claim 1 wherein the masked element comprises a string of characters including a mask symbol.

5. A method as in claim 4 wherein a location of the mask symbol in the string indicates a level position of the mask.

6. A method as in claim 1 wherein the engine is configured to retrieve data from the database according to the request utilizing batch processing.

7. A non-transitory computer readable storage medium embodying a computer program for performing a method, said method comprising:
- causing an engine to receive a request for data stored in a first table comprising a masked element including a key and a mask, the masked element corresponding to a plurality of unmasked elements in a database;
- causing the engine to process the first table to create a second table converting the masked element into an element interval indicating a highest level position of the mask;
- causing the engine to create a third table selecting the plurality of unmasked elements sharing the key;
- causing the engine to perform a first join operation of the second table and the third table to create a fourth table including the plurality of unmasked elements sharing the key and falling within the element interval;
- causing the engine to perform a grouping operation of the fourth table to create a fifth table locating a maximum position of the mask with the plurality of the unmasked elements;
- causing the engine to perform a second join operation of the fifth table and the first table to create a sixth table including the plurality of unmasked elements and the key; and
- causing the engine to process the request on the sixth table.

8. A non-transitory computer readable storage medium as in claim 7 wherein the engine comprises a database engine.

9. A non-transitory computer readable storage medium as in claim 8 wherein the database engine comprises an in-memory database engine receiving instructions from an overlying application layer.

10. A non-transitory computer readable storage medium as in claim 7 wherein the masked element comprises a string of characters including a mask symbol.

11. A non-transitory computer readable storage medium as in claim 10 wherein a location of the mask symbol in the string indicates a level position of the mask.

12. A non-transitory computer readable storage medium as in claim 7 wherein the engine is configured to retrieve data from the database according to the request utilizing batch processing.

13. A computer system comprising:
one or more processors;
a software program, executable on said computer system and embodied upon a non-transitory computer readable storage medium, the software program configured to:
- cause an engine to receive a request for data stored in a first table comprising a masked element including a key and a mask, the masked element corresponding to a plurality of unmasked elements in a database;
- cause the engine to process the first table to create a second table converting the masked element into an element interval indicating a highest level position of the mask;
- cause the engine to create a third table selecting the plurality of unmasked elements sharing the key;
- cause the engine to perform a first join operation of the second table and the third table to create a fourth table including the plurality of unmasked elements sharing the key and falling within the element interval;
- cause the engine to perform a grouping operation of the fourth table to create a fifth table locating a maximum position of the mask with the plurality of the unmasked elements;
- cause the engine to perform a second join operation of the fifth table and the first table to create a sixth table including the plurality of unmasked elements and the key; and
- cause the engine to process the request on the sixth table.

14. A computer system as in claim 13 wherein the engine comprises a database engine.

15. A computer system as in claim 14 wherein the database engine comprises an in-memory database engine receiving instructions from an overlying application layer.

16. A computer system as in claim 13 wherein the masked element comprises a string of characters including a mask symbol.

17. A computer system as in claim 16 wherein a location of the mask symbol in the string indicates a level position of the mask.

18. A computer system as in claim 13 wherein the engine is configured to retrieve data from the database according to the request utilizing batch processing.

* * * * *